United States Patent
Cheng et al.

(10) Patent No.: US 7,130,335 B1
(45) Date of Patent: Oct. 31, 2006

(54) MULTI-LINE ADSL MODEM

(75) Inventors: Yaqi Cheng, Smyrna, GA (US); Adam M. Chellali, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1061 days.

(21) Appl. No.: 09/671,326

(22) Filed: Sep. 26, 2000

Related U.S. Application Data

(60) Provisional application No. 60/156,475, filed on Sep. 28, 1999.

(51) Int. Cl.
*H04B 1/38* (2006.01)

(52) U.S. Cl. ...................................... 375/222

(58) Field of Classification Search ................ 375/219, 375/220, 222, 257, 260, 295, 316; 370/230, 370/235, 257, 280, 285, 294, 295, 400–405, 370/484, 489, 216, 221–222, 225–228, 357, 370/360, 386; 379/93.01, 93.02, 93.05, 93.06, 379/93.09, 93.07, 93.08
See application file for complete search history.

(56) References Cited

U.S. PATENT DOCUMENTS

| | | | | |
|---|---|---|---|---|
| 4,908,819 A | * | 3/1990 | Casady et al. | 370/204 |
| 5,479,447 A | | 12/1995 | Chow et al. | 375/260 |
| 5,530,951 A | * | 6/1996 | Argintar | 379/67.1 |
| 5,841,840 A | * | 11/1998 | Smith et al. | 379/93.01 |
| 5,901,205 A | * | 5/1999 | Smith et al. | 379/93.01 |
| 6,002,671 A | * | 12/1999 | Kahkoska et al. | 370/248 |
| 6,038,297 A | * | 3/2000 | Garland et al. | 379/106.1 |
| 6,075,845 A | * | 6/2000 | Gizara et al. | 379/93.08 |
| 6,259,775 B1 | * | 7/2001 | Alpert et al. | 379/93.05 |
| 6,295,357 B1 | * | 9/2001 | Staples et al. | 379/418 |
| 6,310,894 B1 | * | 10/2001 | Counterman | 370/484 |
| 6,393,110 B1 | * | 5/2002 | Price | 379/93.01 |
| 6,408,056 B1 | * | 6/2002 | Bremer et al. | 379/93.05 |
| 6,480,486 B1 | * | 11/2002 | Kikinis | 370/354 |
| 6,498,806 B1 | * | 12/2002 | Davis | 375/222 |
| 6,507,608 B1 | * | 1/2003 | Norrell | 375/219 |

* cited by examiner

*Primary Examiner*—Khanh Tran
(74) *Attorney, Agent, or Firm*—Steven A. Shaw; W. James Brady; Frederick J. Telecky, Jr.

(57) ABSTRACT

A multi-line ADSL modem (12) and network (10) whereby the multi-line ADSL modem (12) has connections to several ADSL modems (14) at a central office (CO) (16) through a master loop (18), shared loops (20, 22), and/or broadcast loops (84). The master loop (18) provides the basic connection between the multi-line ADSL modem (12) and the CO modem (14) at the central office (16) while maintaining regular telephone service. The shared loops allow the multi-line ADSL modem to share the transmission capacity with other modems. The multi-line ADSL modem is able to receive broadcast data from the central office where several loops are configured as a broadcast loop for downstream transmission only, but which can also be configured for upstream communication transmission only or in combination with downstream transmission to provide bi-directional broadband communications.

20 Claims, 3 Drawing Sheets

MULTI-LINE ADSL MODEM

PRIORITY

This application claims priority of Provisional U.S. Patent application Ser. No. 60/156,475 filed Sep. 28, 1999.

CROSS REFERENCE TO RELATED APPLICATIONS

Cross reference is made to commonly assigned U.S. patent application Ser. No. 9/651,976 entitled "Multi-Client ADSL Modem" filed Aug. 31, 2000, now U.S. Pat. No. 7,031,380 B1 the teachings included herein by reference.

FIELD OF THE INVENTION

The present invention is generally related to communication networks, and more specifically to networks adapted to communicate over standard residential 2-wire phone lines including twisted pair loops adapted to support ADSL communications.

BACKGROUND OF THE INVENTION

Asymmetrical Digital Subscriber Lines (ADSL) is an ANSI standard identified as TI.413 issued in 1995 which presents the electrical characteristics of the ADSL signal as it should appear at a network interface. Generally, ADSL is a high-speed communication technology that allows one client modem, such as that at a remote terminal (RT), to be connected to only one central office (CO) modem through one twisted pair telephone line forming a loop. Typically, discrete multi-tone (DMT) modulation is the chosen line code technique standard in a typical ADSL system. Upstream communications, such as from RT to CO, and downstream communications, such as CO to RT, are divided from one another using frequency division multiplexing (FDM) or using echo canceling, allowing the frequency band for upstream communications to be shared with downstream communications thereby increasing the overall data rate over the loop.

Disadvantageously, the ADSL standard allows only one pair of modems (CO and RT) to communicate over the loop at the same time. The CO modem may send a downstream signal while simultaneously receiving an upstream signal from the RT, frame by frame. Similarly, the RT modem may receive the downstream communication from the CO modem and simultaneously send upstream communication signals to the CO modem.

Since the standardization of ADSL communications, there have been introduced varied implementations and customized uses of the ADSL technology, such as disclosed in commonly assigned U.S. Pat. No. 5,479,447 entitled "Method and Apparatus for Adaptive, Variable Bandwidth, High-Speed Data Transmission of a Multi-Carrier Signal over Digital Subscriber Lines, the teachings of this patent included herein by reference.

As technology evolves and the world becomes more connected including providing access to high-speed internet devices, digital TV (DTV), and even high-definition TV (HDTV), increased bandwidth will be required to connect such devices which may be located at a home or small office. Today, a single pair of twisted telephone line does not provide sufficient bandwidth to allow communications at the data rate required for some of these devices, which is about 20 Mbps for HDTV in the case of line conditioning. Although cable modems may be designed to reach up to 40 Mbps, there are many users that are required to share this data bandwidth. This means that the 40 Mbps is the burst data rate for one user, or the maximum data rate for all users.

There is desired a higher bandwidth modem and communication network that provides for a higher data rate access than that provided by conventional ADSL modems operating over a single loop of twisted pair of telephone wire. Such an improved higher data rate communication is desired to be compatible with ADSL standards, and which can support high speed communications suitable for the internet, digital TV, and even HDTV.

SUMMARY OF THE INVENTION

The present invention achieves technical advantages as an improved modem, communication network, and method of operation thereof that provides a much higher burst data rate than standard ADSL technology without increasing the number of telephone lines. A multi-line ADSL modem is provided that has connections to several ADSL modems at a central office (CO) through a master loop, as well as through shared loops and/or broadcast loops. The master loop provides the basic connection between the multi-line ADSL modem and the corresponding CO modem while maintaining regular telephone service. By accessing and using the additional shared loops, such as those serving other residential devices, the shared loop allows the multi-line modem, preferably a multi-line ADSL modem, to share the transmission capacity of the shared loop with other residential modems. Advantageously, the multi-line ADSL modem is able to receive high speed broadband broadcast data from the central office when several loops are configured as a broadcast loop such as for downstream transmission. Optionally, several loops can also be configured for broadband upstream communication if desired.

DETAILED DESCRIPTION OF THE PREFERRED EMBODIMENT

Figure 1:
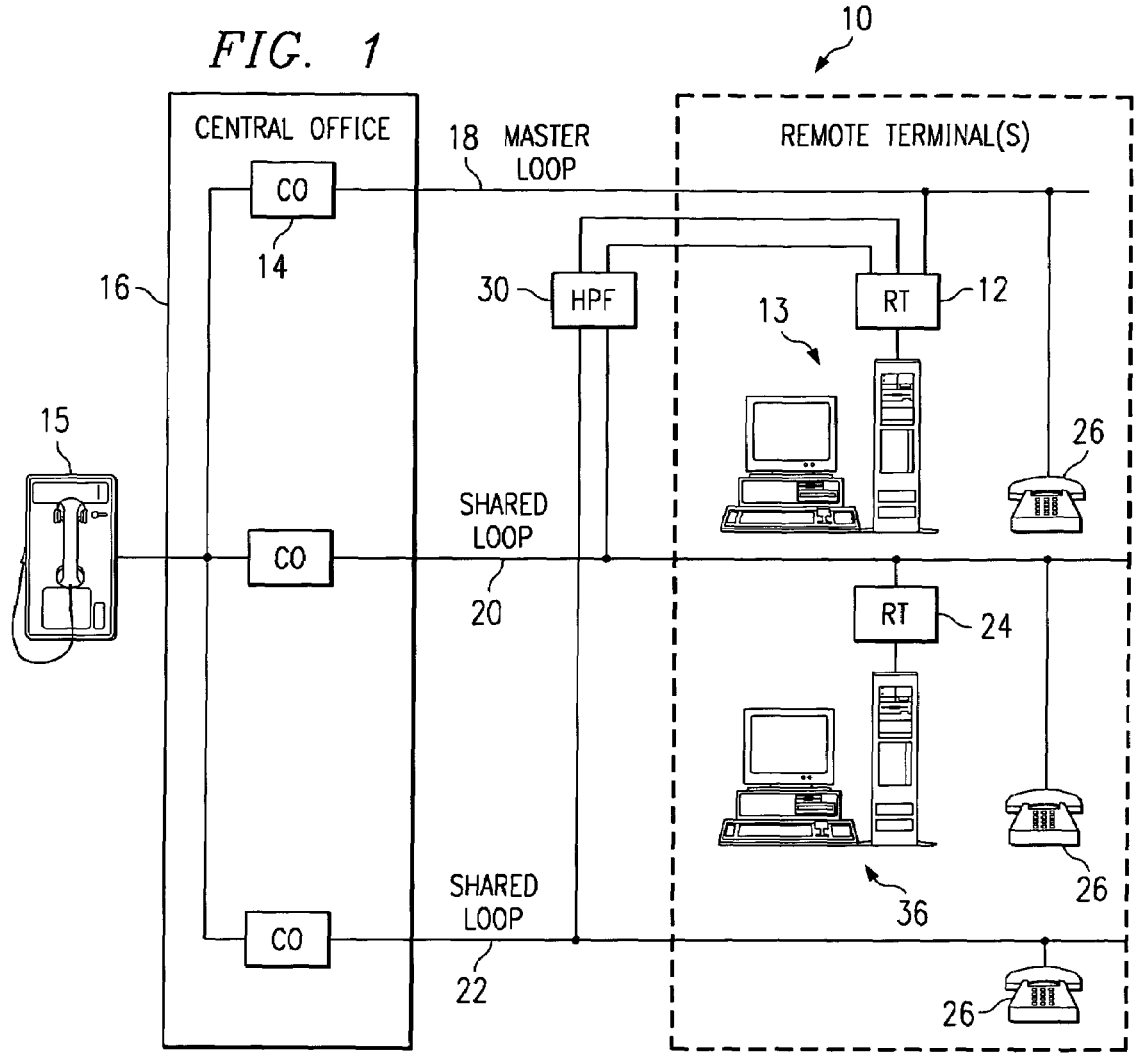
FIG. 1 illustrates a block diagram of a 3-line ADSL system whereby a multi-line modem has one master loop connection for itself, and also shares two other loops thereby providing additional access capacity.

Referring now to FIG. 1, there is illustrated generally at 10 a communication network having a single residential multi-line modem 12 serving a remote terminal 13 and adapted to communicate with a corresponding central office (CO) modem 14 serving a communications terminal 15 at a central office 16 via a master loop 18 comprising a conventional twisted pair telephone line. Advantageously, the multi-line modem (RT) 12 is also adapted to share adjacent loops 20 and 22 connected to the common central office 16 and serving other residential customers which may be served by a single line modem 24, a multi-line modem 12, or just a Plain-Old-Telephone-System (POTS) device 26 such as phone set or fax machine.

As shown in FIG. 1, the multi-line modem 12 is seen to be connected to the respective master loop 18, while also being connected through a high-pass filter 30 to each of the shared loops 20 and 22 to separate out low frequency communications, such as voice communications, resident on the shared loops from the multi-line modem 12. As shown in FIG. 1 the multi-line terminal 12 is connected to two other shared loops 20 and 22 serving nearby residential customers which are primarily served by different respective CO modems 14 located at the same and common central office 16. Although two additional shared loops are shown to be connected to the multi-line modem 12, it is envisioned that only one shared loop, or more than two shared loops, may be connected thereto depending on the desired bandwidth to be available to a customer served by the multi-line modem 12. As illustrated in FIG. 1, the bandwidth of the communication between a user of multi-line modem 12 is increased at least threefold to provide a significantly greater burst data rate over a single loop.

Preferably, the multi-line modem 12, as well as the central office modems 14 are all capable of and adapted to communicate with each other in a format compatible with ADSL standards, as well as modifications thereto.

Figure 2:
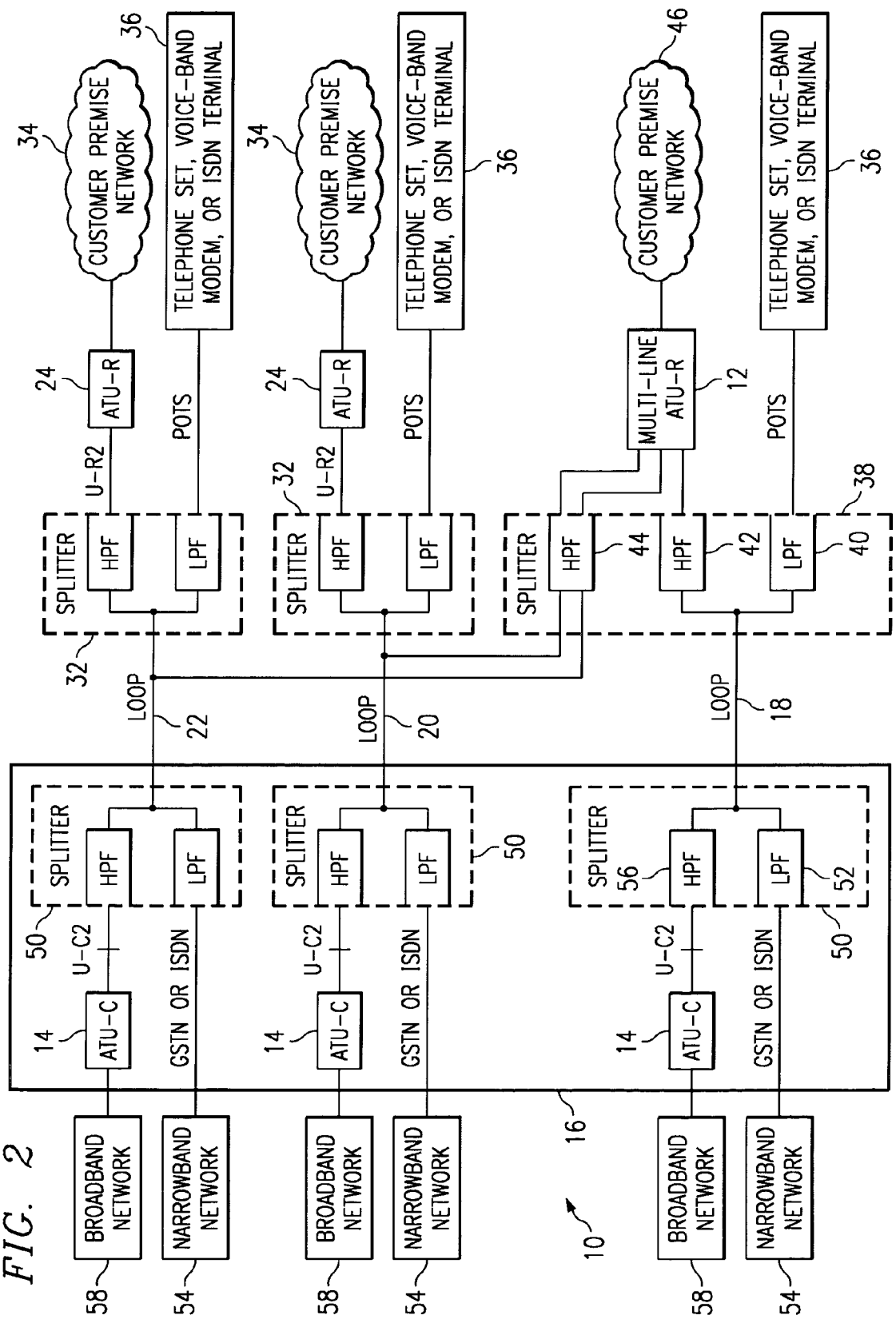
FIG. 2 illustrates a multi-line ADSL system with a multi-line ADSL modem connected to three pairs of loops with additional high-pass filters facilitating the use of the additional loops.

Referring now to FIG. 2, there is illustrated in more detail communication network 10 illustrating a frequency splitter 32 being provided for each standard user having both a customer premise network 34 and having a telephone set, voice-band modem or ISDN terminal 36. Advantageously, a frequency splitter 38 is provided to service the multi-line modem 12. Splitter 38 has a low pass filter 40 and high pass filter 42 servicing and connected to the master loop 18, whereby the low frequency signals are separated out by the low pass filter 40 to the telephone set, voice-band modem, or ISDN terminal 36, and the high pass filter 42 splitting the high frequency signals to the multi-line modem 12. An additional high pass filter 44 is provided in splitter 38 to separate out the high frequency signals of each of the shared loops 20 and 22 for communication to the multi-line modem 12. The high pass filters 42 and 44 provide the high frequency components of both the master loop 18 as well as the shared loops 20 and 22 such that they are all available via the multi-line modem 12 to the high data rate customer premise network shown at 46.

A corresponding splitter 50 is provided at the central office 16 at the opposing end of the respective loop to separate the low frequency signals via a low pass filter 52 to a narrowband network 54, and the high frequency signals via a high pass filter 56 to a broadband network 58. The combination of the splitters 50 and the corresponding splitters 32 and 38 direct the broadband network communications over the respective loops to the customer premise networks, with the communications of the narrowband networks communications being directed to the terminals 36. Advantageously, the high pass filters 42 and 44 separate out the low frequency voice band signals from the shared loop signals for minimum interference. The shared loops may be configured to serve a single line modem, or a multi-line modem, or simply a POTS device such as a phone set or fax machine. The respective high pass filters for the respective modem minimize the interference between the voice band signals and the ADSL band signals.

The multi-line modem 12 advantageously shares one or more other loops serving other customer terminals, without causing interference with the respective voice band signals, such that the improved customer premise network 46 served by the multi-line modem 12 achieves a significantly higher data transmission rate than that achievable with only one twisted pair of conductors forming the master loop 18.

Figure 3:
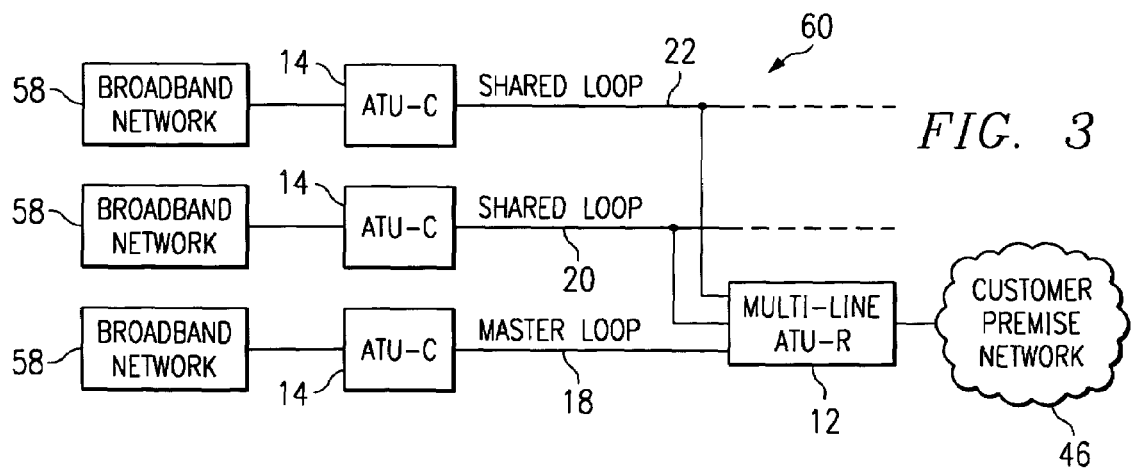
FIG. 3 illustrates a single-user model in a multi-line ADSL system, the single user model allowing a multi-line ADSL modem to share loops without other ADSL modems in operation.

Referring now to FIG. 3, there is depicted a single-user model 60 of the multi-line ADSL system with the multi-line modem 12 connected to the master loop 18, as well as to the shared loops 20 and 22 as shown in FIG. 2. The master loop is shown to be connected to a respective ATU-C modem 14, and is adapted to simultaneously time share one or more of the adjacent loops 20 and 22 serving other terminals located in close proximity to modem 12 to achieve the significantly higher data rate, such as 40 Mbps or more. According to the present invention, the shared loops 20 and 22 may be configured, such as at the multi-line modem 12, so as to provide only downstream communications from the respective CO modems 14 to the multi-line modem 12. Optionally, the communications may be set up for bi-directional broadband communications to facilitate expanded bandwidth communications for both upstream and downstream communications.

Figure 4:
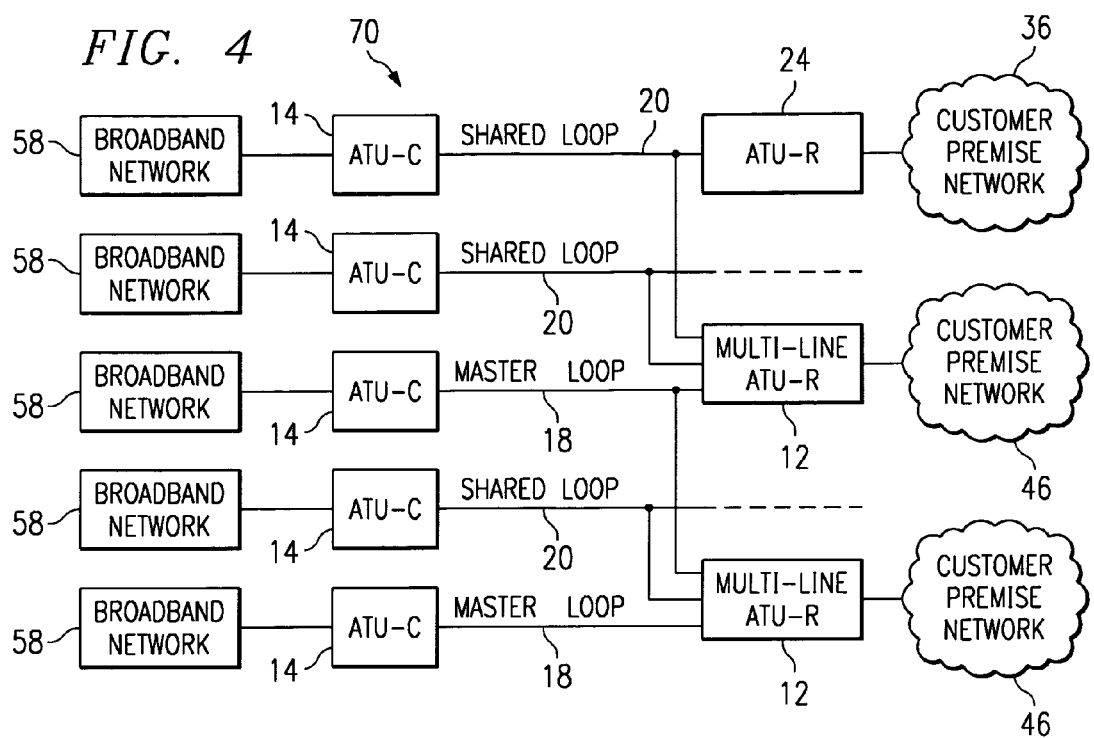
FIG. 4 illustrates a multi-user model in a multi-line ADSL system, whereby the multi-user model allows a multi-line ADSL modem to share loops with other ADSL modems that are in operation.

Referring now to FIG. 4, a multi-user model of a multi-line ADSL system is shown at 70. Each of the multi-line ATU-R modems 12 are seen to be connected to and communicate over a respective master loop 18, and at the same time each of these multi-line modems 12 is configured to share one or more loops serving other modems 24 for achieving a higher data rate. The shared loops may be configured to provide to modem 12 downstream communications only, or providing both upstream and downstream bi-directional broadband communications. The master loop 18 is always set up and configured for both upstream and downstream communications.

The shared loops can be configured to share information in frames, known as time division, using different tones, known as frequency division, or using different codes known as code division. As shown, there are multiple multi-line modems 12 connected to share common shared loops in the multi-user mode.

Figure 5:
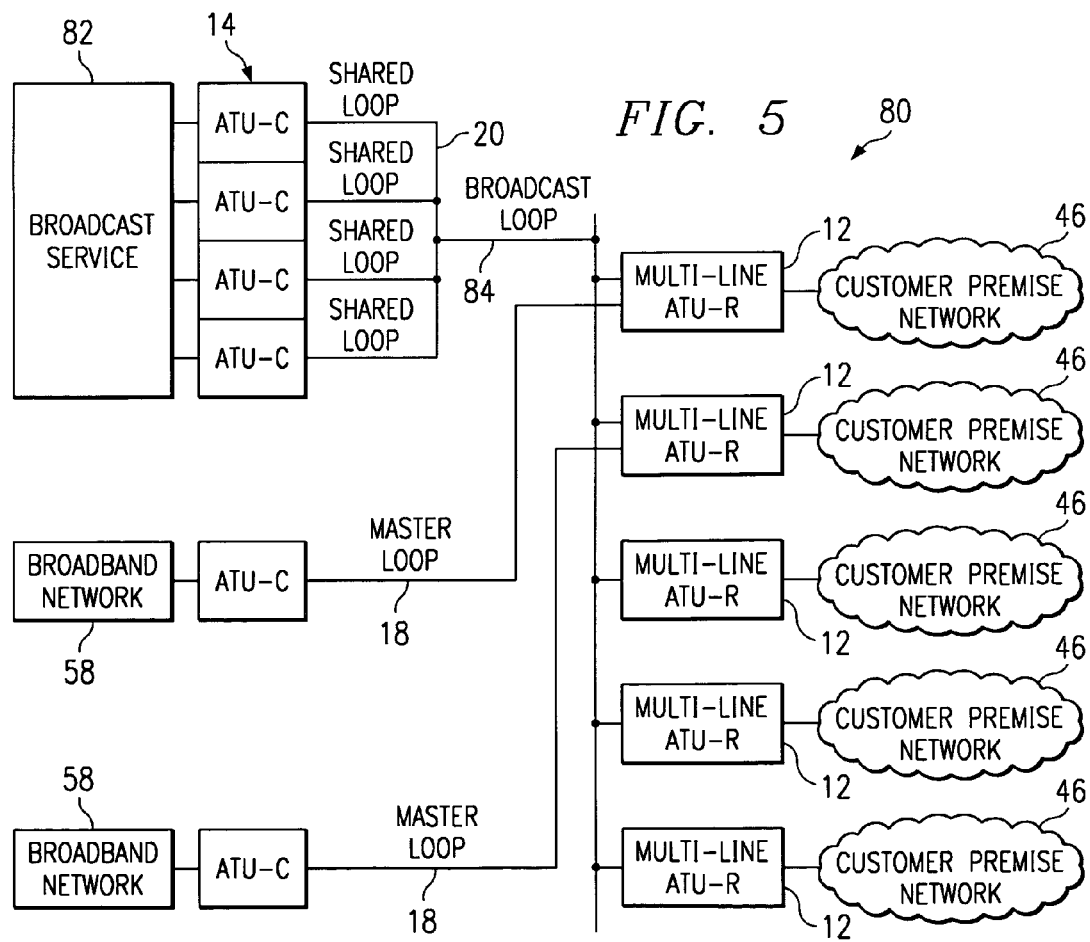
FIG. 5 illustrates the broadcast model in a multi-line ADSL system, this broadcast model being a special multi-user model which allows a multi-line ADSL to, for instance, only listen to and receive the broadband communication from the broadcast loop.

Referring now to FIG. 5, a broadcast model of a multi-line ADSL system 80 is shown. Each multi-line ATU-R modem 12 is seen to be connected to a respective master loop 18, and at the same time configured to time share one or more of the other adjacent loops shown at 20 for achieving a higher data rate than that achievable by communicating ADSL standard signals over just one loop. The shared loops 20 may be configured for downstream communications only, or to facilitate both upstream and downstream communications. The master loop 18 is typically set up for upstream and downstream communications all the time. Again, the shared loops can be shared in frames, (time division), tones (frequency division), or code division such as that similar to CDMA technology used in wireless networks. On the other hand, a broadcast service system 82 can integrate several shared loops into a broadcast service system and integrate several shared loops into a broadcast loop 84. Each of the multi-line modems 12 can receive the broadcast data from the broadcast loop 84 with or without a master loop connected to the dedicated modems 12.

In summary, the present invention achieves technical advantages as an improved multi-line modem and network, and method of using the same, whereby the improved modem communicates over both a master loop and adjacent shared loops to achieve significantly higher data rates so as to facilitate use of high data rate devices including internet communications, digital video and HDTV communication signals. No additional loops are required to be installed as a multitude of twisted pair conductor loops are already installed providing communications between the central office (CO) and the plurality of adjacent customers served by a common central office. The present invention takes advantage of the ADSL standard communications which are well suited for communication over these twisted pair loops. The multi-line modem 12 is specifically configured to share the adjacent shared loops and handle the bi-directional communications as a transceiver between the loops and the customer premise network. The multi-line modem 12 has appropriate hardware and/or software to split high data rate upstream communications from the served customer premise network to the appropriate loops providing a higher bandwidth than that provided by a single loop. Likewise, the multi-line modem 12 is adapted to combine the received downstream communications from each of the respective loops to form a single high data rate signal which is provided to the served customer premise network 46. Again, communications over each of the loops is configures to be compatible with ADSL standards, while the communication signal provide to the customer premise network may be configures to be compatible with any number of standards including high definition television (HDTV), digital video and high speed internet access. The present invention is a low cost high bandwidth network which does not require the installation of any additional loops or the upgrade thereof while achieving a high data rate communication network.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A modem for a communications network, comprising:
    a transceiver;
    a first interface coupled to said transceiver and configured to couple to a first communications terminal; and
    a second interface coupled to said transceiver, wherein said second interface is configured to couple said transceiver to a network node via a first master communication loop and further configured to couple said transceiver to said network node via a shared second communications loop, wherein a second communication terminal communicates with the network node via the shared second communications loop, wherein said first communications terminal is adapted to exchange communication information over said shared second communication loop while said second communication terminal exchanges communication information over said shared second communication loop.

2. The modem as specified in claim 1 wherein said shared second communications terminal is physically located remote from said first communications terminal.

3. The modem as specified in claim 1 wherein said transceiver exchanges communication information in a format compatible with ADSL standards.

4. The modem as specified in claim 1 wherein said first communications terminal exchanges communication information over both said first master communication loop and said shared second communication loop via said second interface in a format compatible with ADSL standards.

5. The modem as specified in claim 4 wherein said second communications terminal is also adapted to exchange communication information over said shared second communication loop in a format compatible with ADSL standards.

6. The modem as specified in claim 1 wherein said transceiver is adapted to simultaneously communicate information over both said first master communication loop and said shared second communication loop with a remote communication device located at a central office (CO).

7. The modem as specified in claim 1 wherein said transceiver is adapted to communicate information over said shared second communication loop using a technique chosen from the group consisting of: time division, frequency division, and code division.

8. The modem as specified in claim 1 wherein said transceiver is adapted to share said shared second communications loop for receiving downstream communication information for said first communication terminal.

9. The modem as specified in claim 1 wherein said transceiver is adapted to share said shared second communications loop for both upstream and downstream communication information for said first communication terminal.

10. The modem as specified in claim 1 wherein both said first master communication loop and said shared second communication loop each comprises a twisted pair of conductors.

11. The modem as specified in claim 3 wherein said second interface is also adapted to communicate voice information over said first master communication loop and has a splitter separating said ADSL communication information from said voice information.

12. A communication network, comprising:
    a first modem to serve a first communications terminal;
    a second modem to serve a second communications terminal; and
    a network node coupled to said first modem via a first master communication loop and to said second modem via a shared second communication loop, wherein said first modem communicates with the network node via said shared second communication loop while said second modem communicates with the network node via said shared second communication loop.

13. The communication network as specified in claim 12 wherein said first modem exchanges communication information compatible with ADSL standards.

14. The communication network as specified in claim 13 wherein said first modem is configured to communicate information simultaneously over both said first master communication loop and said shared second communication loop as an integrated communication having a higher bandwidth than that available over said first master communication loop.

15. The communication network as specified in claim 14 wherein said first modem is configured to also communicate voice communications over said first master communication loop, said first modem having a splitter separating said ADSL communication information from said voice communications.

16. The communication network as specified in claim 12 wherein said first modem is adapted to receive downstream communications over said shared second communication loop.

17. The communication network as specified in claim 16 wherein said first modem is adapted to exchange both upstream and downstream communications over said shared second communication loop.

18. The communication network as specified in claim 12 wherein both said master loop and said second communication shared loop each comprises a twisted pair of conductors.

19. A method of increasing communication bandwidth between a first modem coupled to a first communication terminal and a network node, the first modem being coupled to the network node via a first communication loop, the method comprising:

communicating information between the first communication terminal and the network node simultaneously over the first communication loop and at least one other communication loop, wherein the at least one other communication loop is configured to couple the network node to at least one other communication terminal, while the at least one other communication terminal communicates with the network node.

20. The method as specified in claim 19 wherein said information is compatible with ADSL standards.

* * * * *